Figure 1:
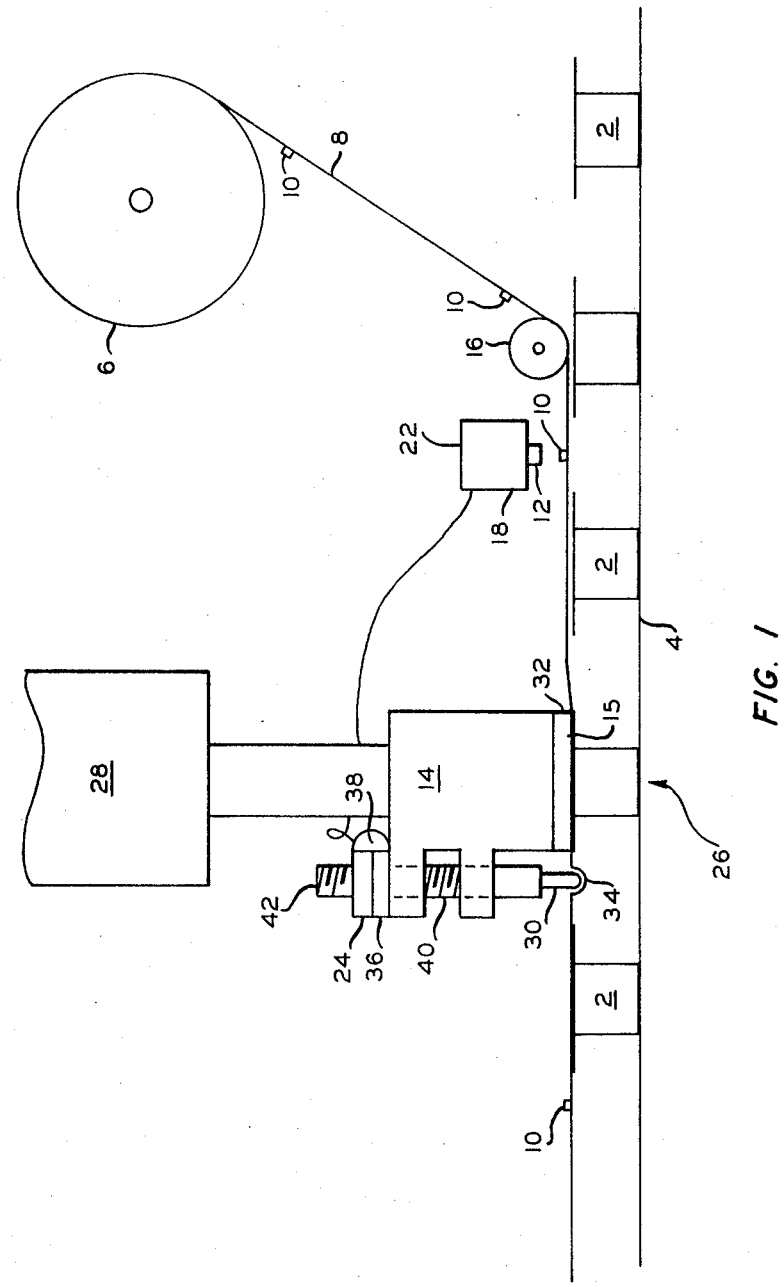

United States Patent
Kinslow, Jr.

[15] 3,652,363
[45] Mar. 28, 1972

[54] FILM POSITIONING APPARATUS

[72] Inventor: William G. Kinslow, Jr., Kansas City, Mo.

[73] Assignee: Phillips Petroleum Company

[22] Filed: Oct. 23, 1969

[21] Appl. No.: 868,676

[52] U.S. Cl...............................156/361, 156/69, 156/355, 156/367

[51] Int. Cl....................................B29c 27/06, B65h 25/06

[58] Field of Search..................156/535, 215, 355, 361, 367, 156/69; 226/113, 44; 101/181

[56] References Cited

UNITED STATES PATENTS

| 2,286,458 | 6/1942 | Bowman et al. | 156/361 |
| 2,375,451 | 5/1945 | Waters | 156/361 X |
| 2,500,230 | 3/1950 | Bailey et al. | 101/181 |
| 2,920,780 | 1/1960 | Hauschild et al. | 156/361 |
| 3,193,430 | 7/1965 | Messmer et al. | 156/361 X |
| 3,294,301 | 12/1966 | Richter | 226/44 |

Primary Examiner—Benjamin A. Borchelt
Assistant Examiner—G. E. Montone
Attorney—Young and Quigg

[57] ABSTRACT

An apparatus for intermittently, longitudinally adjusting a printed portion of a continuous film relative to a container prior to sealing said film to the container to form a cover thereof.

5 Claims, 2 Drawing Figures

INVENTOR.
W. G. KINSLOW, JF
BY Young & Quigg
ATTORNEYS

INVENTOR.
W. G. KINSLOW, JR

BY Young & Quigg

ATTORNEYS

FILM POSITIONING APPARATUS

This invention relates to an apparatus for properly positioning portions of a film being sealed to a container to form the cover thereof. In another aspect, this invention relates to an apparatus for positioning a printed portion of a film relative to a cover prior to sealing one to the other while automatically adjusting said film to compensate for minor film printing irregularities.

The prior art discloses methods for forming and sealing covers to containers, and means to maintain the necessary operational synchronization between the two lines being joined. All of these devices appear to be characterized by positive drive of the film from which the covers are formed, coupled with initial manual adjustment for the proper synchronization.

In the newer film packaging process of heat sealing covers cut from flexible film onto formed containers, it is important to maintain high handling speeds. A rate of container sealing as high as 60 per minute has been contemplated. At such rates, precutting or stamping of the cover sheet prior to sealing greatly complicates the sealing operation by requiring the handling of individual covers which are to be matched with the containers. Thus, it is desirable where employing flexible films as a cover sheet source to handle them as a continuous film sheet during positioning operations. A portion of the film is sealed to the package, and then cut to form an individual cover. The use of a flexible continuous cover film through the sealing steps introduces the problem of positioning the printed labels relative to the containers to be sealed. In a high speed sealing process, the continuous film is under tension and there will be, at times, a tendency toward film stretching. Also there will be inadvertent minor variations in the printing of the labels on the continuous film. The net effect on some of the closed containers is that the label is not centered and therefore not readily acceptable by appearance - conscious purchasers. Moreover, the prior art devices are simply not adapted to automatically compensating for these variations in synchronization.

It is therefore an object of this invention to provide an apparatus which automatically compensates for stretching of flexible film and for minor variations in the labels printed thereon to maintain proper positioning of the label cover on the container to be sealed. Another object of this invention is to provide an apparatus of the above-described type that is of more simple construction, requires reduced maintenance, supervision, and labor, and has fewer moving parts.

Other aspects, objects, and advantages of the present invention will become apparent from a study of the disclosure, the appended claims, and the drawing.

Figure 2:
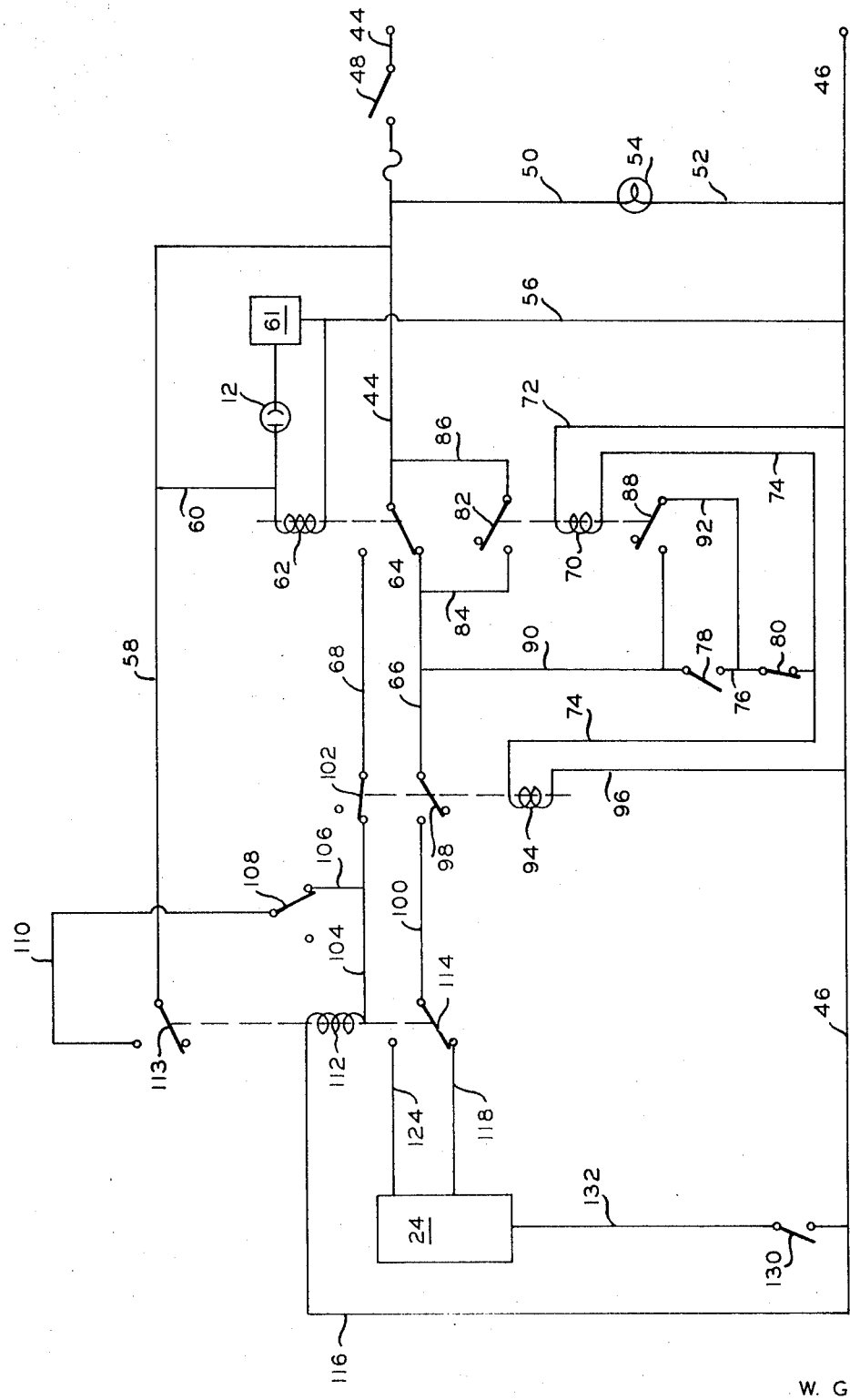

In the drawing:

FIG. 1 is a diagrammatic frontal view of the apparatus of this invention and the containers and sealing film; and FIG. 2 is a diagram of the circuit and electrical controls of the invention.

Referring to FIG. 1, a plurality of containers 2 are placed in spaced apart relationship on a conveyor 4. The film reservoir 6 associated with a film indexing means (not shown) issues forth a continuous, flexible film 8 that is utilized for covering the containers 2. The film 8 can be formed of polyethylene, polypropylene, poly vinyl chloride, or the like and has spaced apart specific portions, such as printed labels, thereon. These specific film portions are carefully spaced apart during the manufacturing of this film 8 with each film portion and associated film sensing area 10 accurately positioned on the film relative to one another. Since these sensing areas 10 of the film 8 are utilized with this invention for positioning the specific film portion relative to the container 2 to be covered, and serves no other purpose on the container 2, it is recommended that the sensing areas 10 be positioned adjacent their associated film portion at a location at which subsequent trimming of the cover removes said areas 10 from the sealed carton 2. The construction of these sensing areas 10 is dependent upon the type of sensor 12 that is utilized in this invention to signal the relative position of the sensing area 10 and hence a label or film portion relative to the sealing element 14. Examples of the various sensors 12 and corresponding sensing areas 10 that can be utilized are:

| Type Sensor | Type Sensing Area on the Film |
| --- | --- |
| Proximity Switch | Magnetic |
| Sliding contact switch | Punched film |
| Photoelectric cell | Printed index mark |

In order to simplify the construction of this apparatus it is preferred that this sensor to be a photoelectric cell and the film be manufactured with a printed index mark that will block or otherwise interrupt the light beam between the photoelectric cell and its source of light.

The film 8 extends from the film reservoir 6 into contact with a guide roller 16, adjacent and along the pathway of the containers 2 to be covered, and to the sealing element 14. The detecting means 18 of this invention is positioned adjacent the continuous film 8 moving toward the sealing element 14, the pathway of the sensing areas 10 on the moving film 8 and is laterally spaced along the pathway of the film 8 between the film reservoir 6 and the sealing element 14. It is preferred that the detecting means 18 be spaced a distance not greater than one printed label or film portion from the sealing element 14. Although the apparatus of this invention can function properly where the detecting means 18 is spaced a greater distance from the sealing element 14, if wider spacing is employed more complex delay means are recommended or specific control of positioning is reduced.

The detecting means 18 comprises a single sensor 12 that is actuated by a sensing area 10 of the film 8 to intermittently deliver a signal and is associated with the film indexing means. The intermittent signal delivered by the detecting means 18 is responsive to the location of a sensing area 10 and associated film portion relative to the sealing element 14. The delaying means 22 comprises a series of relays and is associated with the detecting means for delaying the signal until the film is sealed by the sealing element 14 and thereafter delivering the received signal to a controlling means 24 (said controls to be later described).

The sealing element 14 is positioned adjacent a container 2 on the conveyor 4 at a sealing station 26 at which location said container is brought to rest. The continuous film 8 at the sealing station 26 is positioned between the container 2 and the sealing element 14 and is reciprocably movable by a power source 28 relative thereto between a first position at which a tucker bar 30 and a heating head 32 of the sealing element 14 are spaced from the film 8 and a second position at which the heating head 32 is urging the film 8 into forcible contact with the container 2. At the second position the heating head 32 is energized to heat and seal the film 8 to the container 2.

The tucker bar 30 of this invention is a longitudinal bar having a blunt end for contacting the film 8 and an opposed end attached to the controlling means 24. The controlling means 24 comprises a driving means 36 attached to the tucker bar 30 and a power source such as an electric motor 38. The driving means 36 comprises a longitudinal shaft 40 having the tucker bar 30 mounted on one end thereof and a helical groove 42 formed on the opposed end. The helical groove 42 of the shaft 40 of the driving means 36 is operably connected to the electric motor 38. The controlling means 24 and associated tucker bar 30 are mounted on the sealing element 14 and are movable therewith between the first and second positions thereof. The tucker bar 30 is also longitudinally movable in response to activation of the controlling means 24 along a pathway preferably parallel to the pathway followed by the sealing element 14 moving between the first and second positions. The tucker bar 30 always extends a minimum distance below the bottom surface 15 of sealing element 14 so that the film 8 is tucked as the sealing element 14 reaches the limit of its movement at the second position.

Referring to FIG. 2, lines 44 and 46 are connected to a 115-volt alternating current power source. Switch 48 in line 44 must be closed to provide power to the circuit. Lines 50 and 52, connected to lines 44 and 46 respectively, are connected to pilot light 54. Line 56 is connected to line 46 and the photoelectric control circuit 61 and line 58 is connected to line 44 and to photoelectric control circuit 61 through line 60. Photoelectric circuit 61 containing sensor 12 and controlling relay 62 are conventional and well known in the art. Switch 64 is a single-pole, double-throw switch controlled by relay 62 and is connected to line 44. Switch 64 is normally connected to line 66 and when switched is connected to line 68. Relay 70 is a double-pole, double-throw relay energized through line 72 which is connected to line 46 and through line 74 which is connected to line 66 through line 76 and switches 78 and 80. Switch 82 of relay 70 is connected to line 44 through line 86 and to line 66 through line 84. Switch 82 bypasses switch 64 when closed between lines 84 and 86. Switch 88 of relay 70 is connected to line 66 through line 90 and into line 76 through line 92. Switch 88 bypasses switch 78 when closed between lines 90 and 92. Relay 94 is a double-pole, double-throw relay that is energized through line 96 which is connected to line 46 and line 74 which is connected to line 66 through line 76 and switches 78 and 80, or through line 74, switch 80, and lines 92 and 90 that are connected to line 66 when switch 78 is bypassed by switch 88 of relay 70. Switch 98 of relay 94 is connected to line 66 and 100 when closed by the relay 94. Switch 102 of relay 94 is connected to line 68 and relay 112 through line 104 when closed and is connected to line 106, switch 108, line 110, and switch 113. Switch 113 is connected to line 110 and line 58. Relay 112 is a double-pole, double-throw relay which is connected to line 46 through line 116 and is energized when line 104 is connected through closed switch 102 and when switch 64 is closed to line 68, or through line 106, switch 108, line 110 and switch 113 which bypass switches 102 and 64. Switch 114 of relay 112 is connected to line 100 and to motor control 24 through line 118. Switch 114 in the opposed position is connected to motor control 24 through lines 100 and 124. Switch 130 is connected to motor control 24 through lines 46 and 132.

In the operation of the apparatus of this invention the container 2 and the specific portions of the film 8 are intermittently positioned at sealing station 26 synchronous with sealing element 14 reaching its second position. As the film 8 passes the detecting means 18 the single sensor 12 is actuated by a sensing area 10 of the film to intermittently deliver a signal to delaying means 22 responsive to the location of the sensing area 10 and associated film portion relative to the sealing element 14. At the termination of movement of the film 8 by the indexing means, the sealing element 14 and associated tucker bar 30 move to the second position at which location the film is tucked, and the heating head 32 is energized for sealing the film to the container 2. During the movement of the sealing element 14 from the second toward the first position, the film indexing means is actuated and the film 8 and containers 2 are moved along their pathways.

Any signal delivered by the sensor 12 is delayed by the delaying means 22 to a moment subsequent to movement of the sealing element 14 and associated tucker bar 30 from the second toward the first position at which time the signal of the sensor is delivered to the controlling means 24. In response to the signal received by the controlling means 24, the electric motor 38 is energized to rotate the driving means to extend or retract the tucker bar 30 a preselected distance relative to the heating head 32 and surface 15 of the sealing element 14.

The signal delivered by the single sensor 12 for movement of the tucker bar 30 is dependent upon the position of the sensing area 10 scanned by said sensor 12 during that particular segment of operation. If the sensing area 10 is moved past the sensor 12 during movement of the film by the film indexing means, the sensor 12 delivers a signal that causes the controlling means 24 to retract the tucker bar 30 a preselected distance. If the sensor 12 is not actuated by a sensor area 10 during movement of the film by the film indexing means, i.e., the film 8 is not indexed and tucked a distance sufficient to move the sensing area adjacent the sensor 12, the sensor 12 delivers a signal that causes the controlling means 24 to extend the tucker bar 30 a preselected distance. If, on the other hand, the specific portions of the film 8 are being indexed to correctly position the portion relative to the container 2 at the sealing station 26, the sensing area 10 is positioned adjacent the sensor 12 at the termination of film indexing and tucking and no signal is delivered by said sensor 12 thereby resulting in the tucker bar 30 remaining at that position relative to the heating head 32 during the next consecutive sealing operation.

By so constructing the apparatus of this invention, the blunt end 34 of the tucker bar 30 contacts the film at a location past the sealing element 14 and moves the film relative to the sealing element 14 during movement of the sealing element 14 to the second position prior to contact of the heating element 32 with the film 8. The distance the film 8 is moved relative to the sealing element 14 is dependent upon the position of the tucker bar 30 relative to the heating head 32. Since each specific portion of the film 8 is scanned by the sensor 12 prior to sealing and a responsive signal is delivered by the sensor 12 for desired relative positioning of the tucker bar 30, each specific film portion is automatically correctly positioned for sealing operation.

The length of extension or retraction of the tucker bar in response to a received signal is dependent upon the allowable tolerance of film printing. For example, if the film printing tolerance is controlled to plus or minus one-sixteenth inch, then it is recommended that the length of tucker bar movement for each signal be one thirty-second seconds inch in order to avoid excessive over- or undercorrection.

In the operation of the electrical controls of this invention, as the sealing element 14 reaches its second or down position, switch 78 is closed. If sensing area 10 does not reach the light path of the photocell sensor 12, relay 70 is energized, closing switches 82 and 88. Relay 94 is also energized to close switch 98 and open switch 102. The action of switch 78 is momentary but relays 70 and 94 remain energized through switch 88 which bypasses switch 78. As the sealing element 14 starts its upward travel, switch 130 is closed. During the next movement of the conveyor 2 and the film 8, sensing area 10 passes through the path of the sensor 12 but switch 102 is open and relay 112 is not energized. Switch 114 activates the motor control 24 to lower the tucker bar 30. As the sealing element 14 reaches its first or up position, switches 80 and 108 are opened, thereby resetting the circuit.

The electrical controls operate in a different manner if sensing area 10 stops directly in the light path of sensor 12 as the sealing element 14 reaches its second or down position. Relay 62 is energized, thereby moving switch 64 to line 68 and energizing relay 112. Relay 112 causes switch 114 to contact line 124 and switch 113 to close, thereby connecting lines 110 and 58. Switch 78 is thereafter closed momentarily, but relays 70 and 94 are not energized since switch 64 has broken the circuit. As the sealing element 14 starts its upward movement, the conveyor 2 and the film 8 begin their movement causing sensing area 10 to move from the light path of sensor 12, thereby deenergizing relay 62 and causing switch 64 to close the circuit between lines 44 and 66. Switch 130 closes, switch 98 remains open, and the motor control is not operative. As the sealing element 14 reaches the top of its travel, switches 80 and 108 are opened thereby resetting the circuit.

The electrical controls of this invention operate in still a different manner if the sensing area 10 moves through and past the light path of sensor 12 before the sealing element 14 reaches its second or down position. Relay 62 is energized and closes switch 64 between lines 44 and 68. Relay 112 is energized thereby closing switch 114 between lines 100 and 124 and switch 113 between lines 110 and 58. Since sensing area 10 interrupted the light path of photocell 12 only momentarily, relay 62 is thereby deenergized causing switch 64 to close between lines 44 and 66. Relay 112 remains energized through switch 113. Switch 78 is closed momentarily thereby energizing relay 70 which closes switch 88, thereby bypassing switch 78 and causing switch 82 to close thereby bypassing switch 64. Relay 94 is then energized which moves switch 98 to a closed position between line 66 and line 100 and switch 102 to an open position. As the sealing element 14 begins its upward movement, switch 130 is closed. The circuit of the motor control 24 is then completed through switch 64, and closed switch 98, and switch 114 which is closed between lines 100 and 124 and the motor is reversed. As sealing element 14 reaches its first or up position, switches 80 and 108 are opened, thereby resetting the circuit.

Other modifications and alterations of this invention will become apparent to those skilled in the art from the foregoing discussion, example, and accompanying drawing, and it should be understood that this invention is not to be unduly limited thereto.

What is claimed is:

1. An apparatus for positioning a specific portion of an intermittently-moving, continuous, flexible film relative to a formed container prior to moving a sealing element into contact with the portion of the film, urging the film portion against the container, and sealing said film portion to the container, said film having an individual sensing area associated with each of a plurality of substantially equal spaced apart specific portions of the film, comprising:

a tucker bar attached to the sealing element and movable therewith, said tucker bar having a helical groove and a blunt end for contacting the film at a location past the sealing element and moving the film relative to the sealing element in response to movement of said sealing element;

controlling means associated with the helical groove for extending and retracting the tucker bar a preselected distance relative to the sealing element in response to a received signal;

detecting means adjacent the continuous film moving toward the sealing element, said detecting means being actuated by the sensing area of the film to intermittently deliver a signal responsive to the location of the sensing area and associated film portion relative to the sealing element; and delaying means for delaying the signal of the detecting means until the film is sealed by the sealing element and thereafter delivering said signal to the controlling means.

2. An apparatus, as set forth in claim 1, wherein the controlling means comprises a driving means attached to the tucker bar and an electric motor attached to the driving means, said motor intermittently operable in response to one signal to rotate the driving means and extend the tucker bar a preselected distance and intermittently operable in response to a another signal to rotate the driving means in an opposed direction and retract the tucker bar a preselected distance.

3. An apparatus, as set forth in claim 2, wherein the driving means comprises a shaft having the tucker bar mounted on one end and a helical groove formed on the opposed end, said helical groove connected to the electric motor with said shaft being rotatably and longitudinally movable in response to actuation of the electric motor for longitudinally moving the tucker bar relative to the sealing element.

4. An apparatus, as set forth in claim 1, wherein the detecting means comprises a single sensor actuated by a sensing area of the film to deliver a signal for actuating the controlling means, said sensor delivering a signal for retracting the tucker bar in response to sensing a sensing area passing said sensor and delivering another signal for extending the tucker bar in the absence of sensor actuation by a sensing area of the film.

5. An apparatus, as set forth in claim 4, wherein the single sensor is a photoelectric cell.

* * * * *